United States Patent
Pettigrew et al.

(10) Patent No.: US 7,671,880 B2
(45) Date of Patent: Mar. 2, 2010

(54) OPTICAL DISK LABELING SYSTEM AND METHOD

(75) Inventors: David Pettigrew, Corvallis, OR (US); Andrew Koll, Albany, OR (US); Darwin Mitchel Hanks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2077 days.

(21) Appl. No.: 10/423,541

(22) Filed: Apr. 24, 2003

(65) Prior Publication Data

US 2004/0141385 A1     Jul. 22, 2004

Related U.S. Application Data (63) Continuation-in-part of application No. 10/347,074, filed on Jan. 17, 2003.

(51) Int. Cl.
*B41J 2/435* (2006.01)
*B41J 2/47* (2006.01)

(52) U.S. Cl. .................. 347/224; 347/240; 347/251

(58) Field of Classification Search ........... 347/224, 347/240, 251
See application file for complete search history.

(56) References Cited

U.S. PATENT DOCUMENTS

| | | | |
|---|---|---|---|
| 4,027,217 A | 5/1977 | Harman | |
| 4,298,684 A * | 11/1981 | Bouldin et al. | 430/616 |
| 4,967,286 A | 10/1990 | Nomula et al. | |
| 5,182,741 A | 1/1993 | Maeda et al. | |
| 5,398,231 A | 3/1995 | Shin et al. | |
| 5,498,509 A | 3/1996 | Shin et al. | |
| 5,608,717 A | 3/1997 | Ito et al. | |
| 5,608,718 A | 3/1997 | Schiewe | |
| 5,627,895 A | 5/1997 | Owaki | |
| 5,675,570 A | 10/1997 | Ohira et al. | |
| 5,688,173 A | 11/1997 | Kitahara et al. | |
| 5,729,533 A | 3/1998 | Marquardt | |
| 5,745,457 A | 4/1998 | Hayashi et al. | |
| 5,748,607 A | 5/1998 | Ohira et al. | |
| 5,751,671 A | 5/1998 | Koike et al. | |
| 5,764,430 A | 6/1998 | Ottesen et al. | |
| 5,766,495 A | 6/1998 | Parette | |
| 5,781,221 A | 7/1998 | Wen et al. | |
| 5,846,131 A | 12/1998 | Kitahara | |
| 5,875,156 A | 2/1999 | Ito et al. | |
| 5,915,858 A | 6/1999 | Wen | |
| 5,949,752 A | 9/1999 | Glynn et al. | |
| 5,958,651 A | 9/1999 | Van Hoof et al. | |
| 5,967,676 A | 10/1999 | Cutler et al. | |
| 5,997,976 A | 12/1999 | Mueller et al. | |
| 6,019,151 A | 2/2000 | Wen et al. | |

(Continued)

FOREIGN PATENT DOCUMENTS

EP     1030294     8/2000

(Continued)

*Primary Examiner*—Julian D Huffman
*Assistant Examiner*—Sarah Al-Hashimi (57) ABSTRACT

In one embodiment, a disk labeling system is configured to use calibration indicia to produce calibration data. A disk is then marked using a laser in a first position. The laser is then deflected from the first position into a second position, by applying an input according to the calibration data. The disk is then marked using the laser in the second position.

43 Claims, 8 Drawing Sheets

U.S. PATENT DOCUMENTS

| | | |
|---|---|---|
| 6,026,066 A | 2/2000 | Maezawa |
| 6,034,930 A | 3/2000 | Kitahara |
| 6,074,031 A | 6/2000 | Kahle |
| 6,102,800 A | 8/2000 | Kitahara et al. |
| 6,104,677 A | 8/2000 | Kitihara et al. |
| 6,117,620 A * | 9/2000 | Imaino et al. ............... 430/320 |
| 6,124,011 A | 9/2000 | Kern |
| 6,160,789 A | 12/2000 | Abraham |
| 6,202,550 B1 | 3/2001 | Lee et al. |
| 6,264,295 B1 | 7/2001 | Bradshaw et al. |
| 6,270,176 B1 | 8/2001 | Kahle |
| 6,295,261 B1 | 9/2001 | Kim |
| 6,317,399 B1 | 11/2001 | Ohtani et al. |
| 6,384,929 B1 | 5/2002 | Miller |
| 6,386,667 B1 | 5/2002 | Cariffe |
| 6,403,191 B1 | 6/2002 | Casagrande |
| 6,440,248 B1 | 8/2002 | Mueller |
| 6,452,883 B2 | 9/2002 | Chan |
| 6,469,969 B2 | 10/2002 | Carson et al. |
| 2001/0026531 A1 | 10/2001 | Onodera et al. |
| 2002/0191517 A1 | 12/2002 | Honda et al. |

FOREIGN PATENT DOCUMENTS

| | | |
|---|---|---|
| JP | 58-169354 | 10/1983 |
| JP | 1235036 | 9/1989 |
| JP | 10-011804 | 1/1998 |
| JP | 11-066603 | 3/1999 |
| JP | 2000-242963 | 9/2000 |
| JP | 2000-357330 | 12/2000 |
| JP | 2001-307344 | 11/2001 |
| JP | 2002-203321 | 7/2002 |

* cited by examiner

OPTICAL DISK LABELING SYSTEM AND METHOD

RELATED APPLICATIONS

This patent application is a continuation-in-part of an application filed 17 Jan. 2003 entitled "Radial Position Registration For A Trackless Optical Disc Surface" having Ser. No. 10/347,074.

BACKGROUND

Application of an image to a label surface of a computer disk, such as an optical disk (CD, DVD, etc.) can be accomplished by "burning" the image into a coating of thermally reactive material previously applied to the label surface of the disk. The laser ordinarily used to read or write data from/to the information side of the disk can be used to heat portions of the coating associated with pixels of the image to result in a thermal reaction and creation of the image. The laser is carried by a sled, which is configured to move the laser to each of a number of tracks. By turning the laser on and off, a concentric ring of pixels can be formed in the coating applied to the label area of the disk.

Unfortunately, in most applications, the number of tracks at which the sled is configured to stop is insufficient to result in the resolution required for desirable image quality. Images created where the number of available tracks is too small to support the desired resolution appear to have a narrow annular region or ring of un-reacted coating between each ring of pixels. One possible solution is to reduce disk speed enough that the time the laser spends on each pixel is sufficient to result in "blooming," i.e. the expansion of the pixel due to reaction of coating material adjacent to the pixel. However, this requires more time than many users are willing to spend; also, while the larger pixels fill the narrow annular regions of un-reacted coating, the overall resolution is not improved due to the large pixel size.

As a result, while images created using a thermally reacting coating on a disk have benefit, there is a need to increase the resolution of such images.

SUMMARY

In one embodiment, a disk labeling system is configured to use calibration indicia defined on an optical disk to produce calibration data. A disk is then marked using a laser in a first position. The laser is then deflected from the first position into a second position, by applying an input according to the calibration data. The disk is then marked using the laser in the second position.

BRIEF DESCRIPTION OF THE DRAWINGS

The following detailed description refers to the accompanying figures. In the figures, the left-most digits(s) of a reference number identifies the figure (FIG.) in which the reference number first appears. Moreover, the same reference numbers are used throughout the drawings to reference like features and components.

DETAILED DESCRIPTION

In one embodiment, a disk labeling system is configured to use calibration indicia defined on an optical disk to produce calibration data. Such data provides control over deflection applied to the laser, thereby resulting in disk labels with higher pixel density. A disk may therefore be marked using a laser deflected according to the calibration data to result in two or more rings of pixels marked during the laser's stay at each location to which it is moved by a supporting sled moving along a radial direction over the disk.

Figure 1:
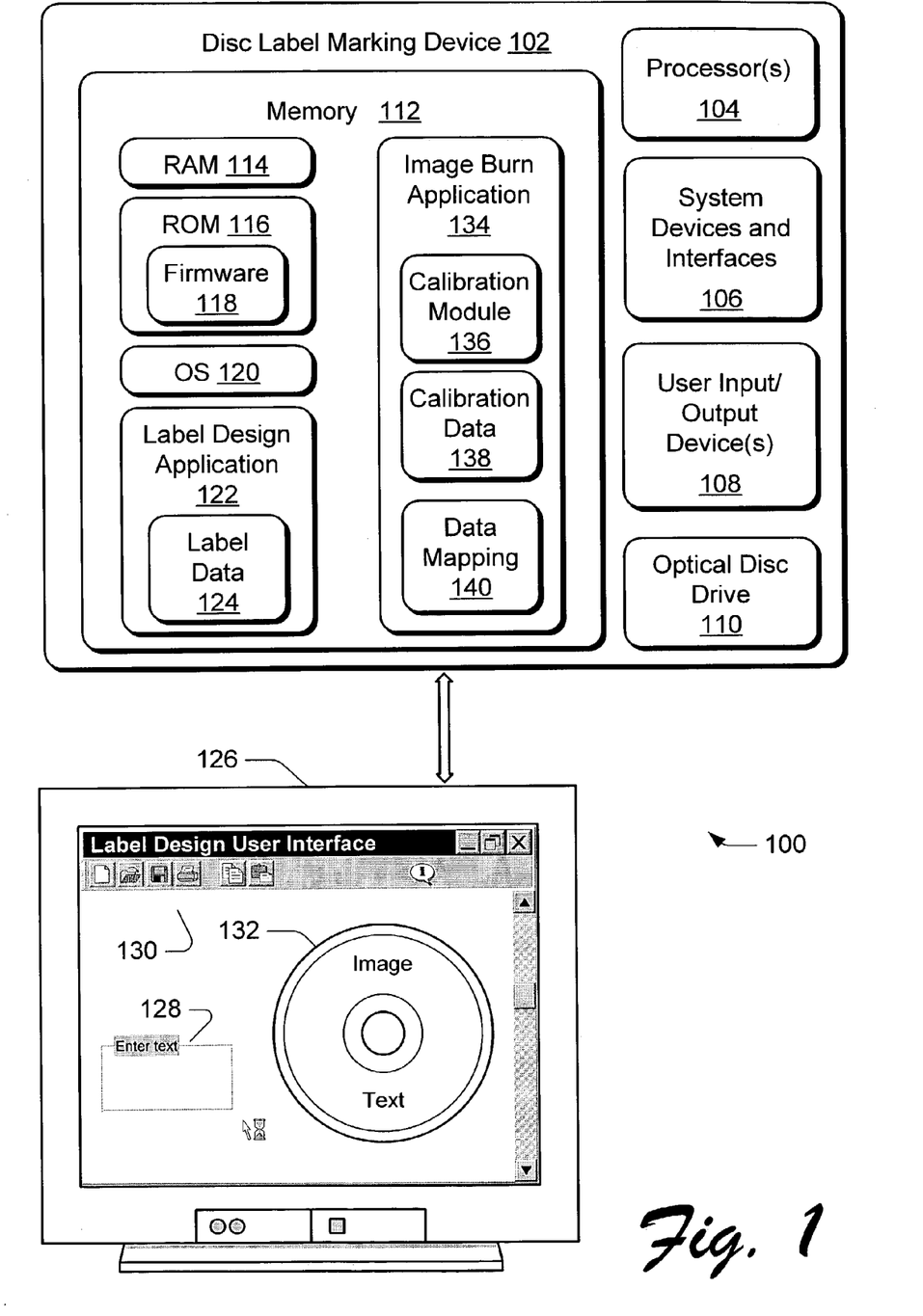
FIG. 1 is a block diagram of an exemplary disk label marking device.

FIG. 1 shows a block diagram of an exemplary disk label marking system 100. The disk label marking system 100 may include a disk label marking device 102 which may be a stand-alone special purpose device, or may be a firmware, hardware or software upgrade or extension to a conventional computer, workstation or music playing and/or storage device. The exemplary disk label marking device 102 may include one or more processors 104. Where a workstation or similar computer is used, the processor 104 could be the existing processor contained within the workstation. A variety of system interfaces and devices 106 may be present, including the busses, ports, interfaces, disk drives, printers and other devices. Additionally, a variety of user input/output devices 108 may be present, such as a keyboard, monitor, and a pointer device such as a mouse. An optical drive 110 may include a CD or DVD drive which may have read or read-write capabilities.

Memory 112 may contain RAM 114 and ROM 116, which may include firmware 118. The firmware 118 may be configured to allow control over the optical drive 110, and to enable the operation of the block diagrams seen in FIGS. 8 through 10. An operating system 120, such as Windows, UNIX or other operating system may operate in memory, and provide a run-time environment, within which applications such as a label design application 122 and an image burn application 134 maybe operated.

The label design application 122 allows a user to create, or obtain over a network, label data 124. As seen in FIG. 1, an exemplary label design application 122 provides a user interface 126 which allows the user to enter text at 128 and to obtain and enter graphics using tools 130. The text and graphics are displayed at on an image of a disk 132, to provide a preview of the appearance of a printed disk. When the user is satisfied with the appearance of the preview disk image 132, the label data 124 may be saved. Similarly, where the user desires, the label data may be obtained over a network, such as the Internet. This allows the user to obtain a wide variety of artwork to mark onto the user's disk.

Figures 2, 3:
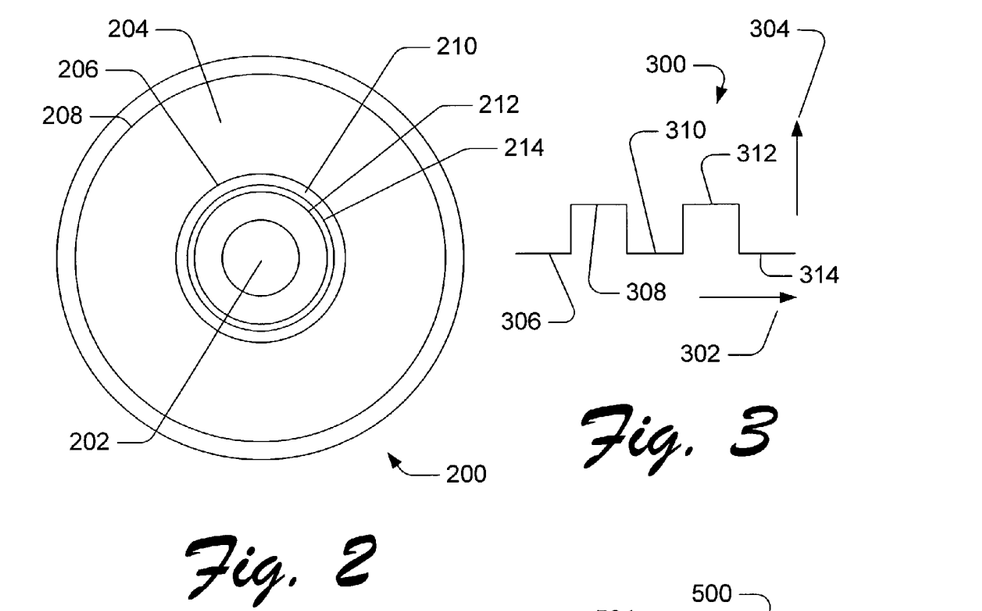
FIG. 2 is an orthographic view of a first exemplary disk illustrating a first possible embodiment of calibration indicia.
FIG. 3 is a graphical illustration of exemplary deflection vs. reflection information associated with the exemplary calibration indicia seen in FIG. 2.
Figures 4, 5:
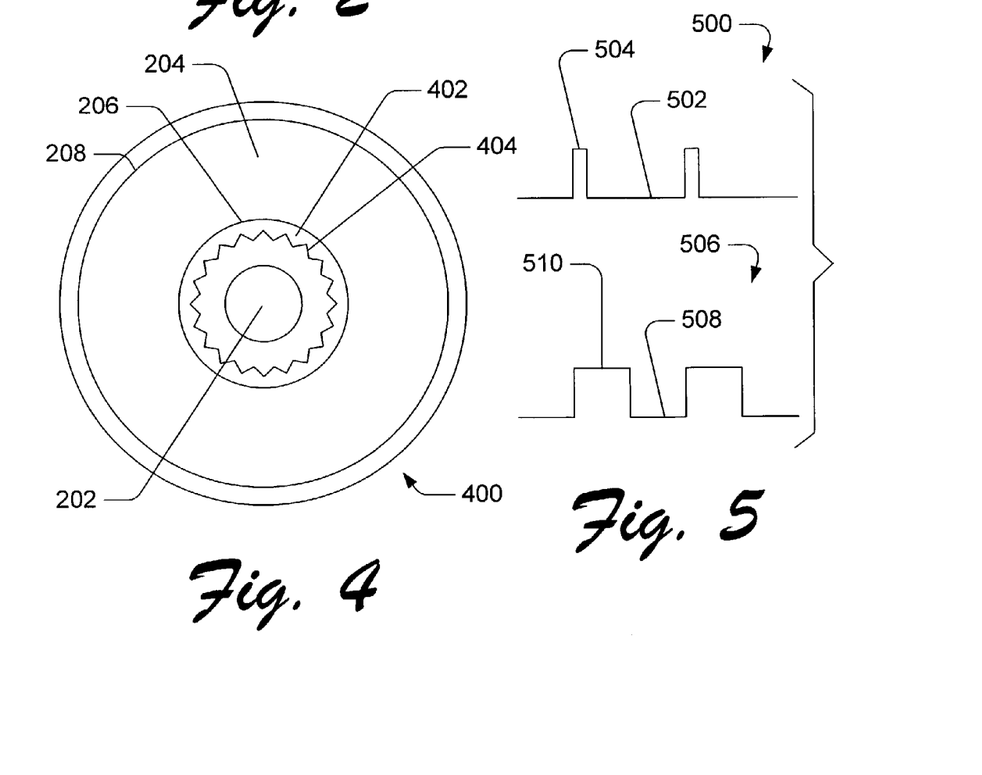
FIG. 4 is an orthographic view of a second exemplary disk illustrating a second possible embodiment of calibration indicia.
FIG. 5 is a graphical illustration of exemplary deflection vs. reflection information associated with the exemplary calibration indicia seen in FIG. 4.
Figure 6:
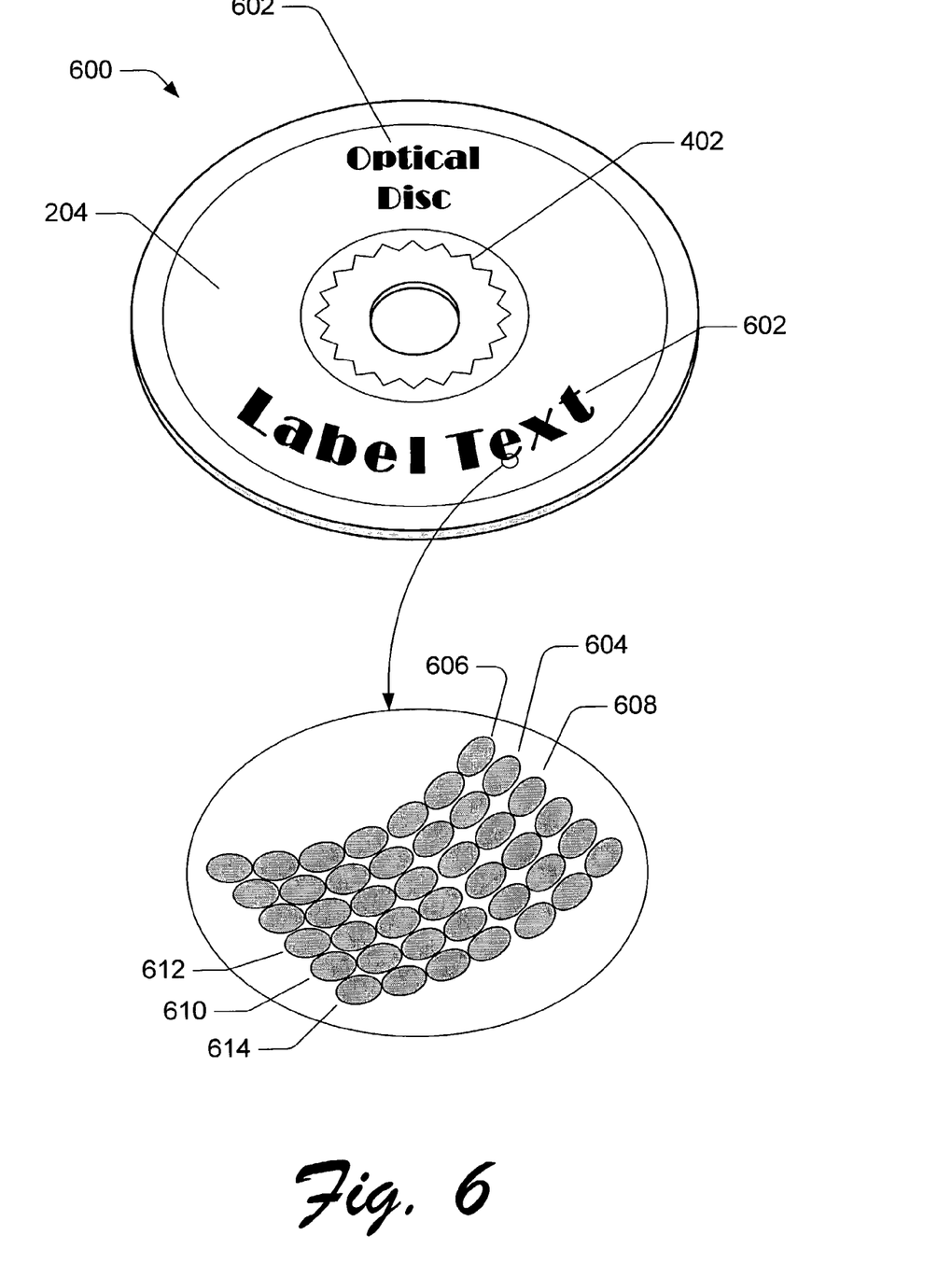
FIG. 6 is an isometric view of an exemplary disk having information printed or "burned" onto the label region of the disk.

An image burn application 134 is configured to apply the label data 124 to the label portion of a disk. A calibration module 136 is configured to examine calibration indicia (as seen in FIGS. 2, 4, 6) to produce calibration data 138. As will be seen in greater detail below, the calibration data 138 may include voltages to be applied to a tracking coil to deflect the laser. The use of such voltages may be understood by realizing that the laser is moved in a radial direction—from one discrete location to another—over the disk as the disk spins. By deflecting the laser appropriate amount(s), the laser may be able to mark two or more concentric rings of pixels rather than one ring at each discrete position to which the laser is moved. Accordingly, the calibration data facilitates marking a disk with a greater pixel density and resolution.

The image burn application 134 may optionally include a label data mapping module 140. The mapping module 140 is configured to map label data 124 according to the pixel resolution determined by the calibration data 138. For example, where the calibration data 138 supports three rings of pixels for each discrete location to which the sled moves the laser along a radial direction over the disk, the resolution of the image marked on the disk will be greater than where the calibration data supports only two rings of pixels. Accordingly, the mapping module 138 maps the input label data 124 into output label data (such as for storage at 738, FIG. 7) having a resolution which is consistent with the resolution support by the image burn application.

FIG. 2 shows an orthographic view of a first exemplary disk 200 illustrating a first possible embodiment of calibration indicia. The disk 200 typically defines a central hole 202. A label region 204 is typically coated with thermally reactive material. The label region typically extends between inner and outer boundaries 206, 208. Exemplary calibration indicia 210 includes inner and outer concentric circular lines 212, 214. The lines may be printed or otherwise marked on the disk according to any desired manufacturing technique. The lines 212, 214 should be precisely located, and should provide a high contrast with the surrounding background, and should be appropriate for the reflection of laser light. It should be noted that the number of calibration rings could be altered dramatically in similar implementations of the optical disk labeling system. For example, a larger number of calibration rings may result in an improvement in the calibration process. This is particularly true where a greater number of annular rings of pixels are applied at each location to which the sled and laser are moved. For example, where six annular rings of pixels are applied by deflecting the laser by application of six different voltage levels to the tracking coil at each location to which the laser is moved by the sled, it may help to have three or six (or more or less) different calibration lines, which may aid in the calibration of the required voltages.

FIG. 3 is a graphical illustration 300 of exemplary deflection vs. reflection information associated with the exemplary calibration indicia 210 seen in FIG. 2. In the exemplary graph 300, deflection of the laser beam is measured along the horizontal axis 302, and reflection of the laser beam is measured along the vertical axis 304. Reflection is low at 306, but increases at 308, where greater deflection in the laser beam results in contact with the inner calibration ring 212. Further deflection results in less reflection 310, but still further deflection results in greater reflection at 312, corresponding to reflection off the outer calibration ring 214. Still further deflection of the laser results in less reflection at 314, as the laser beam is deflected radially outwardly of the outer calibration ring 214. Accordingly, where the geometry of the calibration rings is known, the input applied to result in the deflection can be calibrated with the actual deflection, as measured by the reflection off the calibration indicia 210.

FIG. 4 is an orthographic view of a second exemplary disk 400 illustrating a second possible embodiment of calibration indicia 402. The exemplary calibration indicia 402 include a saw tooth line having a plurality of teeth 404 which represent non-annular line segments.

FIG. 5 shows two graphical illustrations 500, 506 of exemplary deflection vs. reflection information associated with the exemplary calibration indicia seen in FIG. 4. The graph 500 shows the output of an optical sensor resulting from a first input causing deflection of the laser beam. The square wave, having low points 502 and high points 504 results from the laser beam hitting the tip of the saw tooth pattern. That is, since only the tip of each tooth is stuck by the laser beam, the portions 502 of the graph resulting from reflected laser light are narrower than the portions of the graph resulting from lack of reflection. Similarly, the graph 506 shows the output of an optical sensor resulting from a second input causing deflection of the laser beam. The square wave, having low points 508 and high points 510 results from the laser beam hitting a middle portion of the saw tooth pattern. Accordingly, the laser beam strikes the saw tooth pattern approximately half the time, resulting in an approximately square wave having approximately equal portions associated with beam reflection and non-reflection.

FIG. 6 shows an isometric view of an exemplary disk 600 having calibration indicia 402 and label images 602 resulting from label data 124 (FIG. 1) that has been marked or "burned" onto the label region 204 of the disk 600. A portion of the label image is show in greatly enlarged form in the inset view. In an exemplary application, a segment of an annular ring 604 shows seven pixels which were marked or "burned" into the coating covering the label region 204 without deflection of the laser. The seven pixels associated with a row 606 inside row 604 and a row 608 outside row 604 were marked or "burned" into the coating by deflecting the laser in a radially inward or outward direction, respectively.

Continuing to refer to the enlarged portion of FIG. 6, a segment of an annular ring 610 shows seven pixels which were marked or "burned" into the coating covering the label region 204 without deflection of the laser after the laser was moved incrementally toward the outer edge of the disk 600. The seven pixels associated with a row 612 inside row 610 and a row 614 outside row 610 were marked or "burned" into the coating by deflecting the laser in a radially inward or outward direction, respectively. Accordingly, by deflecting the laser inwardly and outwardly, annular rows of pixels 606, 612 and 608, 614, respectively, were marked. Thus, deflection of the laser allowed rows 606, 608, 612 and 614 to be marked. Without deflection, these rows would have been "white space," which would have detracted from the appearance image 602.

Figure 7:
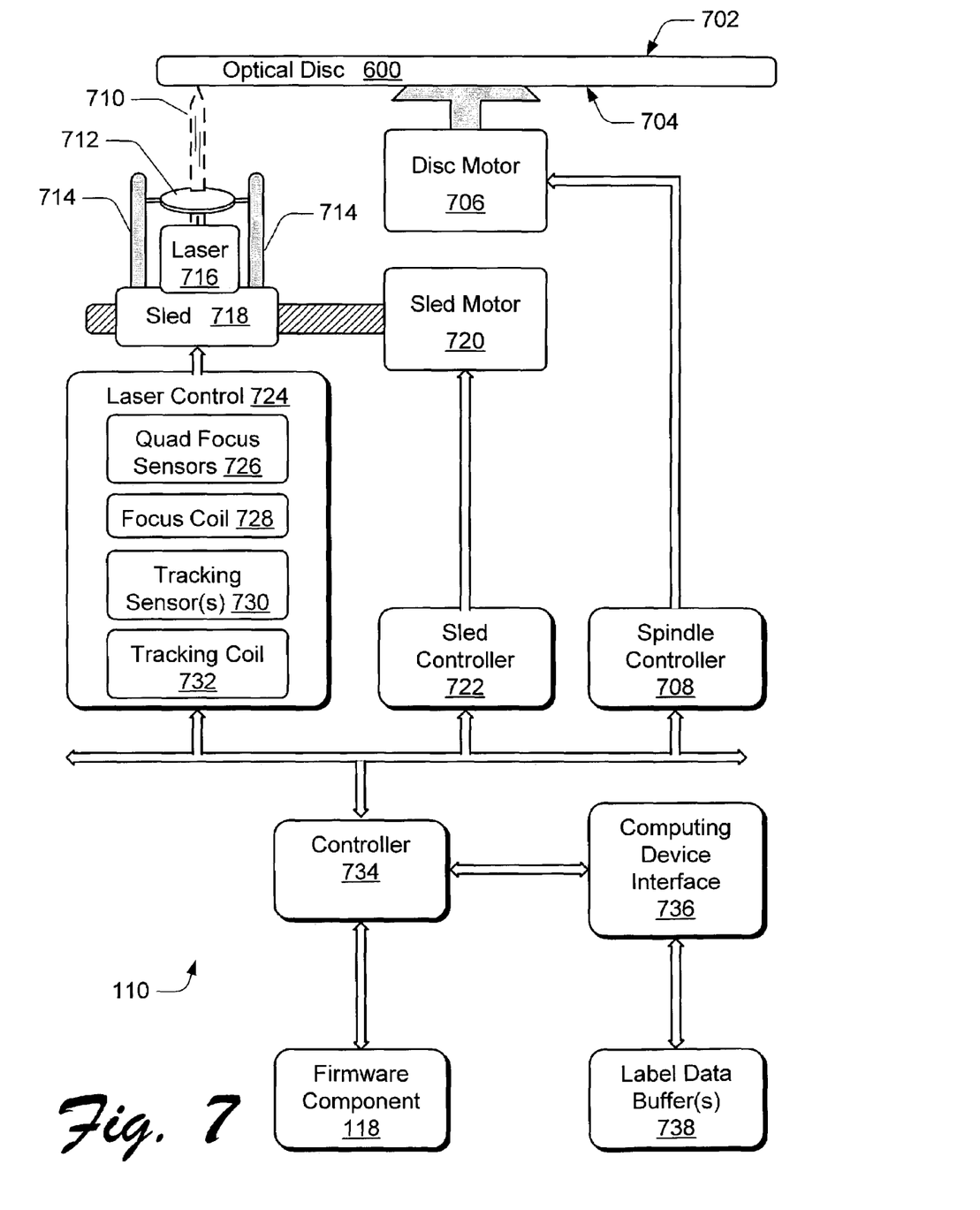
FIG. 7 is an exemplary implementation illustrated by a somewhat diagrammatic view of the exemplary disk drive system of FIG. 1.

FIG. 7 is a somewhat diagrammatic view of the exemplary disk drive and controller system 110 of FIG. 1. A disk 600 having an information side 702 is oriented to position the label side 704 for marking. The disk is rotated by a disk or spindle motor 706, which is controlled by the spindle controller 708. The laser beam 710 strikes the coated surface of the label side 704 of the disk 600 after passing through a lens 712 carried by supports 714. The laser 716 is carried by a sled 718, which is moved in a radial direction by the sled motor 720. In a typical application, the sled motor 720 advances the sled 718, carrying the laser 716, in incremental steps from the inside edge 206 (FIG. 2) of the label region 204, to the outside edge 208 of the label region under the direction of a sled controller 722.

A laser controller 724 is in communication with the laser, and controls the operation of the laser, as well as associated tracking coils and sensors. In the example of FIG. 7, a quad focus sensor 726 typically contains four sensors, and is designed to sense the distance between the laser and the disk. A focus coil 728 is designed to cooperate with the quad focus sensor 726, and to move the laser closer to, and further from, the disk 600.

A tracking sensor 730 is designed to provide an indication if the laser 716 is aimed too much either radially inwardly or outwardly. A tracking coil 732 is designed to deflect the laser 716 radially inwardly or outwardly, i.e. to point the laser 716 slightly more toward the center of the disk 600 or slightly more to the outer edge of the disk 600.

In the implementation of FIG. 7, the quad focus sensor 726 is configured to provide input indicating the presence of calibration indicia 210, 402. The tracking coil 732 is configured to deflect the laser 716 in either radial direction, i.e. toward the center or edge of the disk. As a result, in the calibration process (as will be seen in greater detail below) voltages applied to the tracking coil 732 are compared to output of the quad sensor 726. Thus, voltages applied to tracking coil 732 may be selected which result in deflection by a radial distance approximately equal, for example, to the radial height of one pixel. Accordingly, as seen in the example of FIG. 6, by applying the proper voltage to the tracking coil, a row of pixels 606, 608 may be marked on either side of a row of pixels 604 created by applying an intermediate voltage to the tracking coil.

A controller 734 may communicate through an interface 736 with the processor 104. Alternatively, the functionality of the controller 734 may be performed by the processor 104. The label data may reside in buffer 738, accessible to the controller 734 and interface 736.

Figure 8:
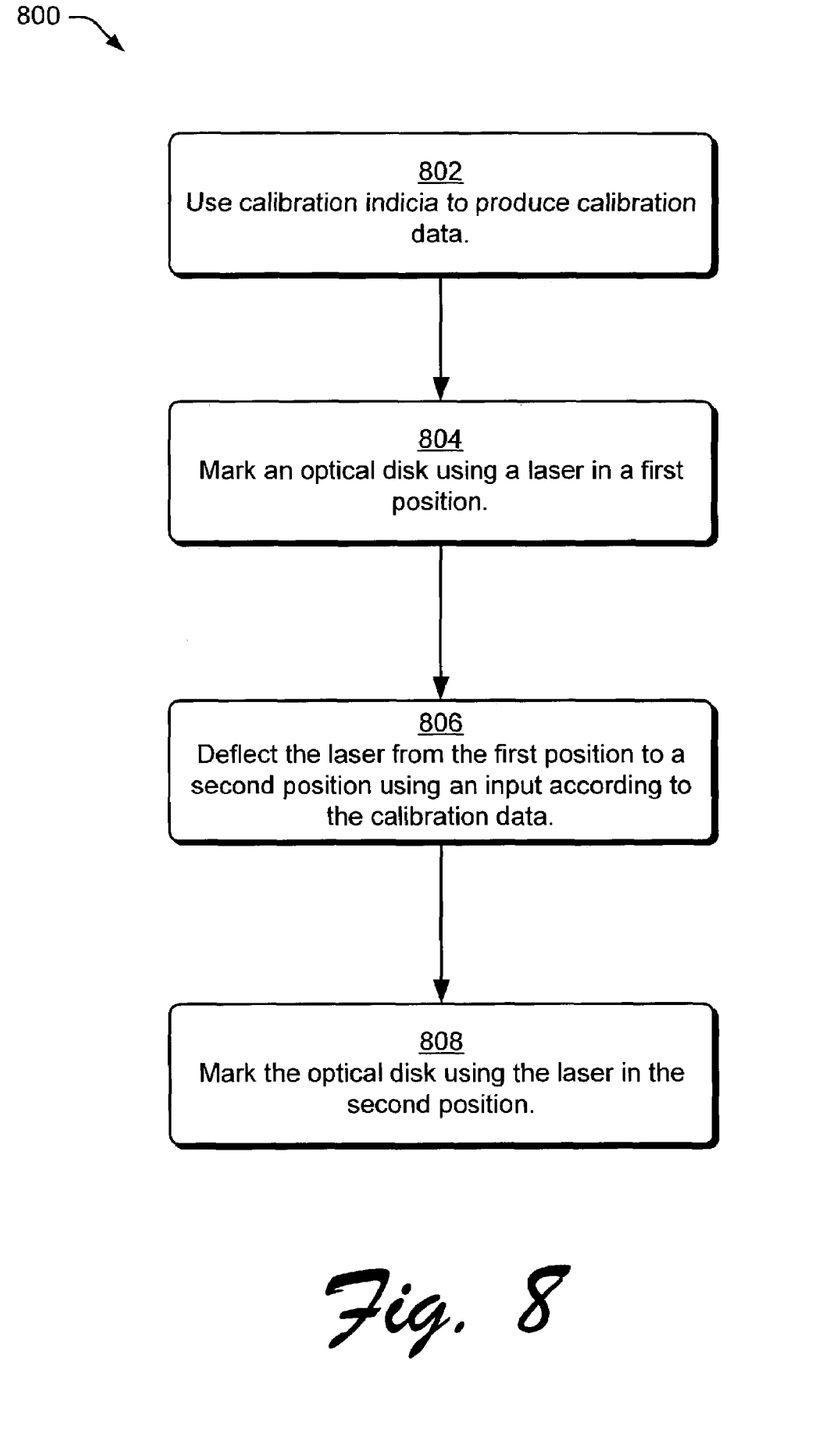
FIG. 8 is an exemplary implementation illustrated as a flow diagram showing operation of an exemplary disk label marking system.

FIG. 8 is a flow diagram 800 showing operation of an exemplary disk label marking system 100. At block 802, calibration indicia 210 are used to produce calibration data 138. This concept is discussed more fully in FIG. 9. However, as previously seen, exemplary voltages applied to the tracking coil 732 are used to deflect the laser 716, resulting reflection of light off the calibration indicia 210, 402, which is measured by the focus sensor 726. Thus, the voltages associated with the desired deflection amounts may be determined.

At block 804, an optical disk is marked using a laser in a first position. For example, as seen in FIG. 6, a first voltage may be applied to the tracking coil 732 to result in marking a row of pixels 606. At block 806, a second voltage (i.e. a changed voltage potential) is applied to the tracking coil 732, as determined by the calibration data 136 (FIG. 1). At block 808, the optical disk 600 is marked using the laser in the second position, which is associated with the second voltage. For example, this may result in the marking of a row of pixels 604 which is adjacent to the first row 606 which was marked.

Figure 9:
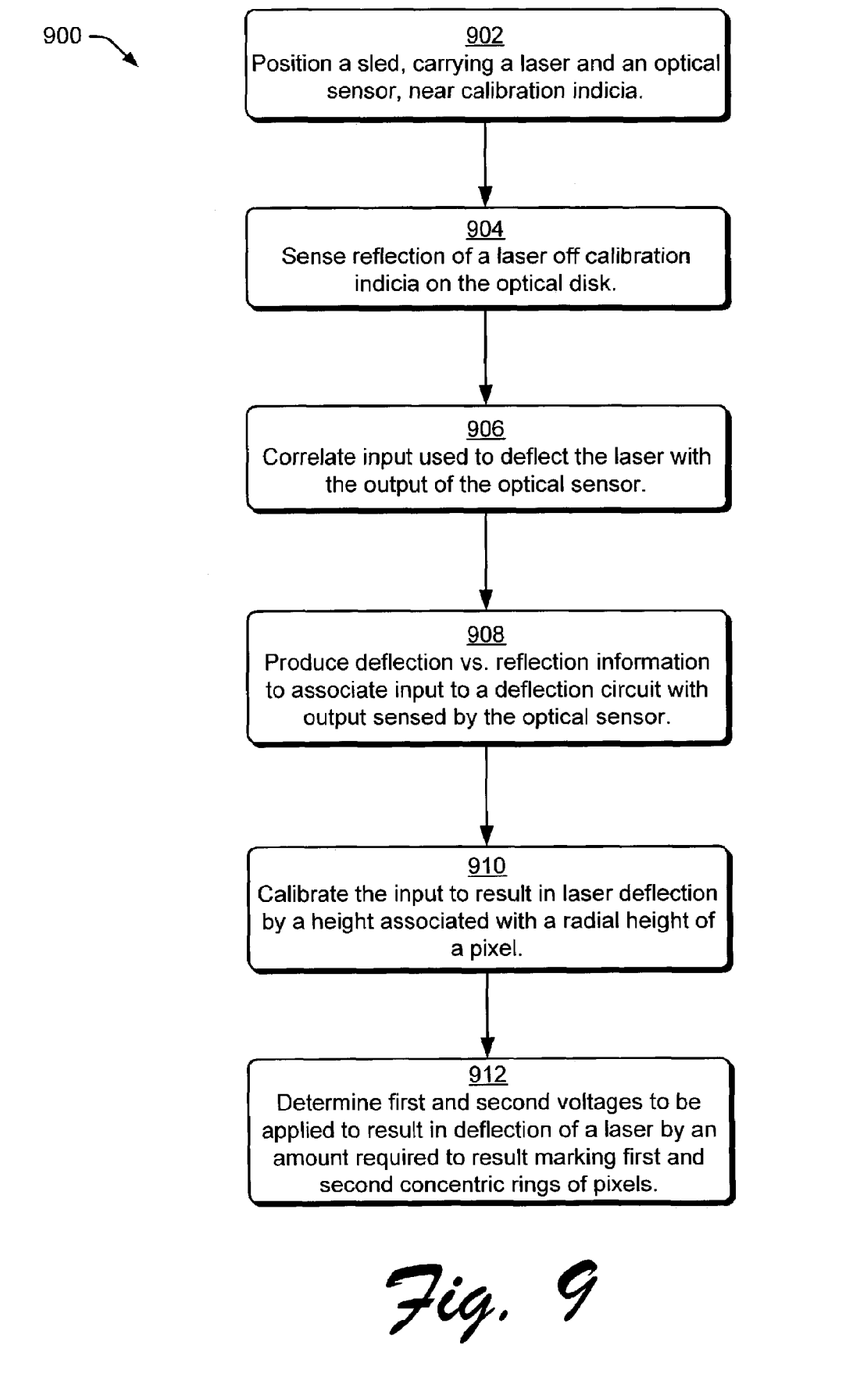
FIG. 9 is an exemplary implementation illustrated as a flow diagram showing operation of an exemplary calibration module.

FIG. 9 is a flow diagram 900 showing operation of an exemplary calibration module 134 (FIG. 1), and therefore expands upon the discussion of block 802 in FIG. 8. At block 902, a sled 718, carrying a laser 716 and an optical sensor 728 is positioned near calibration indicia 210, 302. At block 904, the sensor 728 detects laser light 710 reflected off the calibration indicia 210, 302. At block 906, the input used to deflect the laser 716 is correlated with the output of the optical sensor 728. In a typical scenario, different voltages may be applied to the tracking coil 732, and the deflection resulting from each voltage level correlated with an amount of deflection. The amount of deflection is determined by the sensor 726 with reference to the calibration indicia. Accordingly, at block 908, deflection vs. reflection information is produced. At block 910, the input to result in laser deflection by a height associated with a radial height of a pixel is calibrated. Where desired, several such values may be calibrated, so that a plurality of rows of pixels may be marked, by deflecting the laser light in the radial direction such as by operation of the lens 712, without actually moving the laser in the radial direction. At block 912, the voltages to be applied to the tracking coil 732 which are associated with the calibration are determined. For example, it may be desirable to mark eight (or some alternate number) of rings of pixels at each radial distance that the sled locates the laser. Accordingly, eight voltage levels to be applied to the tracking coils must be determined, to result in laser deflection to mark the eight rings. In this case, it may be helpful if the calibration indicia include four to eight concentric rings. The radial distance separating each ring may, for example, be equal to a multiple (e.g. 1, 2 or 3) of the radial distance separating each ring of pixels. Where this information is known, the calibration may be performed, and the voltages to be applied to the tracking coil 732 may be determined.

Figure 10:
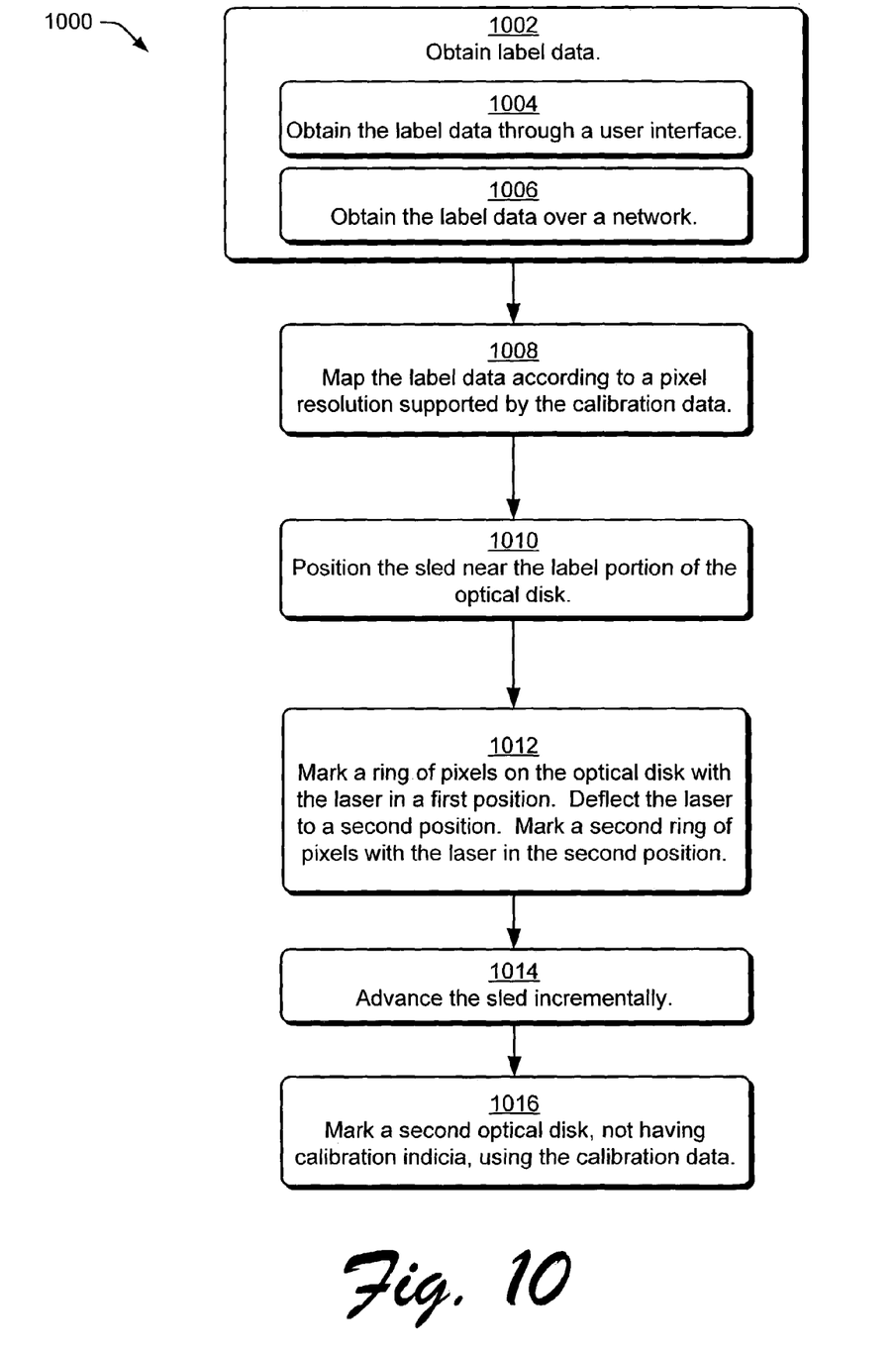
FIG. 10 is an exemplary implementation illustrated as a flow diagram showing operation of an exemplary image burning application.

FIG. 10 is a flow diagram 1000 showing operation of an exemplary image burning application within the disk label marking device of FIG. 8. At block 1002, label data 124 is obtained. At block 1004, the label data may be obtained from the label design application 122, using the user interface 126. This allows the user to create the label data personally. At block 1006, the label data may also be obtained over a network, such as the Internet.

At block 1008, the label data may be mapped, such as by mapping module 138, according to a pixel resolution supported by the calibration data. For example, where very high resolution label data is obtained over the Internet, the mapping module 138 may be used to reduce the resolution of that label data, so that the pixel resolution as determined by the calibration data 136 may be used to mark the data onto a disk.

At block 1010, the sled 718 is positioned near the label portion 204 of a disk. At block 1012, a ring of pixels is marked on the disk with the laser in a first position, wherein the first position is associated with a first voltage potential applied to the tracking coil 732. The laser is then deflected to a second position by application of a second voltage to the tracking coil 732. A second ring of pixels is then marked on the disk. Depending on the calibration data, this may be repeated. At block 1014, the laser 716 is physically moved by moving the sled 718. Additional rings of pixels may be applied by repeating blocks 1012 and 1014 until the image is completely marked on the label area 204 of the disk.

At block 1016, in some applications, a second disk, not having calibration indicia, may be marked using the existing calibration data, as determined using a disk having calibration indicia.

Figure 11:
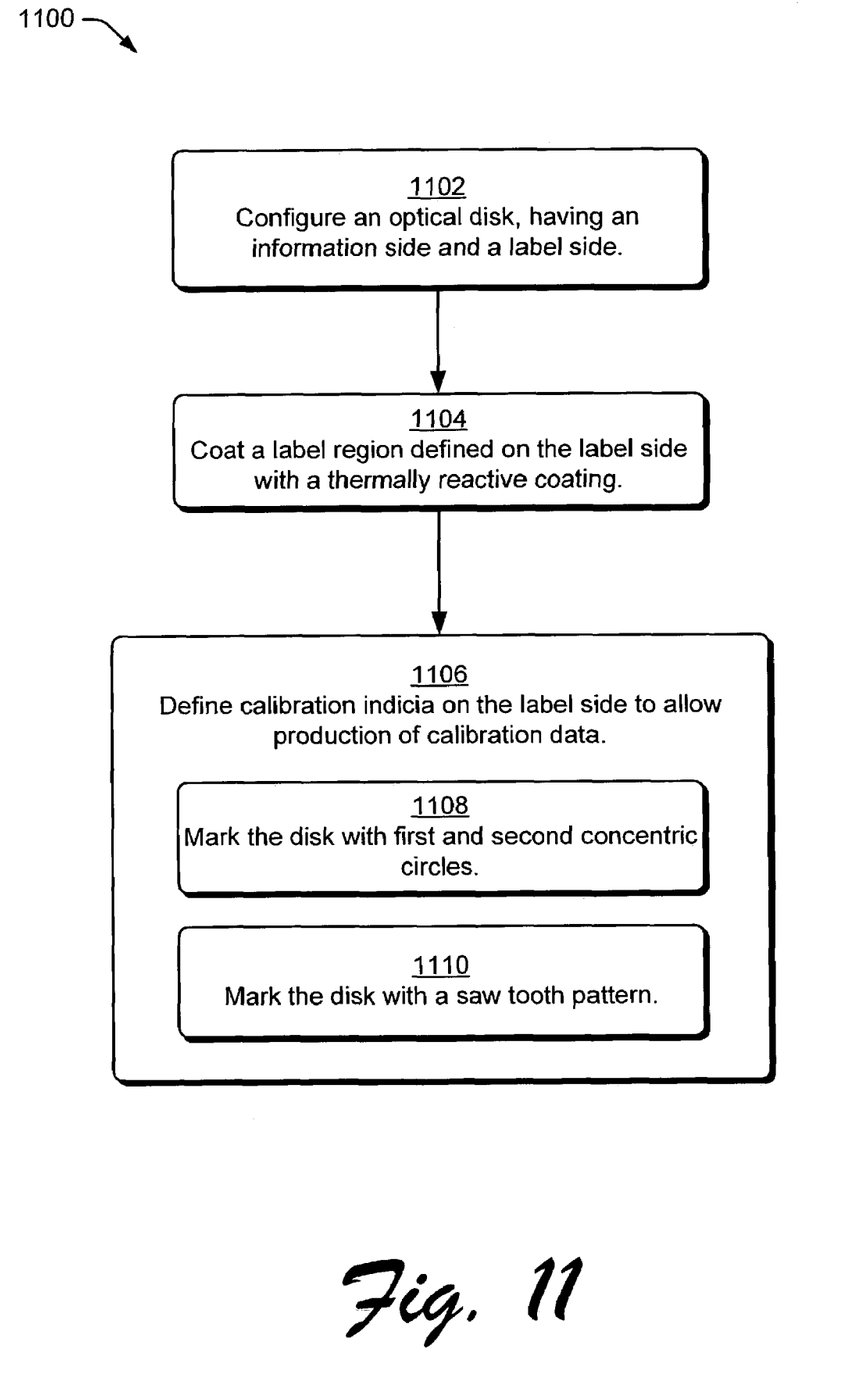
FIG. 11 is an exemplary implementation illustrated as a flow diagram showing an exemplary method of manufacturing an optical disk consistent with the exemplary disk label marking system.

FIG. 11 is a flow diagram 1100 showing an exemplary method of manufacturing an optical disk consistent with the exemplary disk label marking device. At block 1102, an optical disk is configured, having an information side 702 and a label side 704. A label region 204 is coated with a thermally reactive material. Such a material changes color or appearance after the application of heat, such as that produced by a laser.

At block 1106, calibration indicia are defined on the label side of the disk to allow the production of calibration data 136. At block 1108, the disk may be marked with fist and second concentric circles 210. Additionally, more (such as four, eight or twenty) circles or other markings may be added, as desired. At block 1110, the disk may be marked with calibration indicia comprising a saw tooth pattern 402.

Although the disclosure has been described in language specific to structural features and/or methodological steps, it is to be understood that the appended claims are not limited to the specific features or steps described. Rather, the specific features and steps are exemplary forms of implementing this disclosure. For example, while one or more methods have been disclosed by means of flow charts and text associated with the blocks, it is to be understood that the blocks do not necessarily have to be performed in the order in which they were presented, and that an alternative order may result in similar advantages. Moreover, the elements of the method may be performed by any desired means, such as by the execution of processor-readable instructions defined on a processor-readable media, such as a disk, a ROM or other memory device.

Additionally, while use of a disk having a coating which is thermally reactive to result in a monochromatic image is disclosed by way of example, other coatings having thermally, optically or otherwise reactive characteristics to result in mono-, bi-, tri- or full-color images could be substituted, while still in keeping with the principles disclosed.

As used herein, the phrase computer- or processor-readable media or medium can refer to any medium that can contain, store or propagate computer executable instructions. Thus, in this document, the phrase computer- or processor readable medium may refer to a medium such as an optical storage device (e.g., a CD ROM), a solid state memory device such as RAM or ROM, a magnetic storage device (e.g., a magnetic tape), or memory or media or other technology. The phrase computer- or processor-readable medium or media may also refer to signals that are used to propagate the computer executable instructions over a network or a network system, such as an intranet, the World Wide Web, the Internet or similar network. Additionally, reference has been made to circular rows of pixels. However, such circular rows of pixels may actually be near-circular segments of a spiral, and still referred to as circular rows of pixels. And further, the pixels may include color or monochrome pixels, which may be reacted or blank.

What it is claimed is:

1. A processor-readable medium comprising processor-executable instructions for:
    using disk calibration indicia to produce calibration data;
    marking a disk using a laser in a first position;
    deflecting the laser by a radial distance associated with a height of a pixel, from the first position into a second position, by applying an input according to the calibration data; and
    marking the disk using the laser in the second position.

2. A processor-readable medium as recited in claim 1, additionally comprising processor-executable instructions for:
    marking a second disk, wherein the second disk does not have calibration indicia, using the calibration data.

3. A processor-readable medium comprising processor-executable instructions for:
    sensing, with an optical sensor, reflection of a laser striking calibration indicia defined on an optical disk;
    correlating an input used to deflect the laser with the sensing of the reflection of the laser striking the calibration indicia; and
    calibrating the input to result in laser deflection by a radial distance associated with a height of a pixel to be marked, thereby producing calibration data.

4. A processor-readable medium as recited in claim 3, additionally comprising processor-executable instructions for:
    marking the optical disk using the laser in a first position; and
    deflecting the laser from the first position into a second position, by applying an input according to the calibration data; and
    marking the optical disk using the laser in the second position.

5. A processor-readable medium as recited in claim 3, additionally comprising processor-executable instructions for:
    marking a second optical disk, wherein the second disk does not have calibration indicia, using the calibration data.

6. A processor-readable medium as recited in claim 3, wherein the calibrating additionally comprises processor-executable instructions for:
    producing deflection vs. reflection information to correlate the input used to deflect the laser with reflection of the laser sensed by the optical sensor; and
    inferring the calibration data based on the deflection vs. reflection information.

7. A processor-readable medium as recited in claim 3, wherein the calibration additionally comprises processor-executable instructions for:
    producing deflection vs. reflection information to correlate deflection of the laser as measured by reflection off non-annular elements in the calibration indicia and sensed by the optical sensor with the input used to deflect the laser; and
    inferring the calibration data based on the deflection vs. reflection information.

8. A processor-readable medium as recited in claim 3, wherein the calibrating comprises processor-executable instructions for:
    determining a voltage to be applied to a tracking coil to result in deflection of the laser by a radial height of at least one annular row of pixels.

9. A processor-readable medium as recited in claim 3, additionally comprising processor-executable instructions for:
    generating label data, through operation of a user interface, for marking on a surface of the optical disk by the laser; and
    mapping the label data according to a pixel resolution supported by the calibration data.

10. A processor-readable medium as recited in claim 3, additionally comprising processor-executable instructions for:
    receiving label data, over a network, for marking on a surface of the optical disk by the laser; and
    mapping the label data according to a pixel resolution supported by the calibration data.

11. A processor-readable medium as recited in claim 3, additionally comprising processor-executable instructions for:
    positioning a sled, carrying the laser and the optical sensor, near the calibration indicia;

producing deflection vs. reflection information to correlate input used to deflect the laser with reflection sensed by the optical sensor and based on the calibration indicia;

inferring the calibration data based the deflection vs. reflection information;

determining a voltage to be applied to a tracking coil to result in deflection of the laser by a radial height of at least one annular row of pixels by analysis of the deflection vs. reflection information;

obtaining label data for marking by the laser on a surface of the optical disk;

mapping the label data according to a pixel resolution supported by the calibration data;

advancing the sled to a label portion of the optical disk;

marking the optical disk using the laser in a first position;

deflecting the laser from the first position into a second position, by applying the voltage;

marking the optical disk using the laser in the second position; and advancing the sled.

12. A method for printing on a rotating disk, comprising:

sensing a laser striking calibration indicia defined on a rotating disk;

determining an input used to deflect the laser to one or more positions where the calibration indicia is sensed;

generating calibration data by calibrating a first input that deflects the laser by an amount required to mark a first annular ring of pixels and a second input that deflects the laser by an amount required to mark a second annular ring of pixels, wherein the radial distance between the first and second annular rings is associated with a height of the pixel; and using the calibration data to print on a rotating disk by marking certain pixels in the rings.

13. The method as recited in claim 12, additionally comprising:

utilizing the first and second inputs, obtained when operating the rotating disk, to mark a second disk, not having calibration indicia.

14. The method as recited in claim 12, additionally comprising:

moving a sled carrying the laser and an optical sensor to a plurality of locations on the rotating disk; and at each of the plurality of locations, marking first and second annular rings of pixels using the first and second inputs to deflect the laser by first and second amounts.

15. A method as recited in claim 12, wherein the calibrating additionally comprises:

producing deflection vs. reflection information to correlate input used to deflect the laser with reflection sensed by an optical sensor; and inferring calibration data based on the deflection vs. reflection information.

16. A method as recited in claim 12, wherein the calibration additionally comprises:

producing deflection vs. reflection information to correlate input used to deflect the laser with laser reflection off non-annular elements in the calibration indicia sensed by the optical sensor; and inferring calibration data based on the deflection vs. reflection information.

17. A method as recited in claim 12, wherein the calibration additionally comprises:

determining first and second voltages to be applied to a tracking coil to result in deflection of the laser consistent with marking the first and the second annular rings of pixels.

18. A disk labeling system, comprising:

a label design application to produce label data;

a calibration module to associate a signal to deflect a laser with a response from a sensor tracking laser light reflected off disk calibration indicia, and to calculate calibration data comprising a deflection input required to deflect the laser by an amount associated with a radial height of a pixel to be marked on a label region of a disk; and a label burn application, to consume the label data and to associate pixels contained within the label data with the calibration data from the calibration module thereby marking the pixels at desired positions on the label region of the disk by deflecting the laser using the calibration data.

19. The disk labeling system of claim 18, additionally comprising:

a spindle controller to control disk speed, wherein the disk speed is governed in part by the calibration data, and wherein greater disk speed is associated with calibration data resulting in greater pixel density.

20. The disk labeling system of claim 18, additionally comprising:

a sled controller to control sled speed, wherein the sled speed is calculated to allow at least two deflection inputs to be applied to the laser before a sled position is incremented.

21. The disk labeling system of claim 18, additionally comprising:

a tracking coil to receive the deflection input, and to deflect the laser an amount calculated to allow an inner row of pixels to be applied adjacent to an outer row of pixels.

22. The disk labeling system of claim 18, wherein the deflection input is a voltage level applied to a tracking coil, and wherein the sensor tracking laser light is a focus sensor.

23. A processor-readable medium comprising processor-executable instructions for labeling a disk, the processor-executable instructions comprising instructions for:

producing label data according to user input;

calibrating a signal to deflect a laser by monitoring a response from a sensor tracking laser light reflected off disk calibration indicia, wherein the calibrating comprises calculating an input required to deflect the laser by a radial height of a pixel to be marked on a label region of the disk; and utilizing the input to deflect the laser to mark the disk with pixels at specific locations in accordance with the label data.

24. A processor-readable medium as recited in claim 23, wherein the calibrating comprises processor-executable instructions for:

sending a signal to a tracking coil to deflect the laser and receiving a signal from a focus sensor based on laser light reflected from the calibration indicia.

25. A processor-readable medium as recited in claim 23, additionally comprising processor-executable instructions for:

controlling disk speed as a function of calibration data, wherein greater disk speed is associated with calibration data resulting in greater pixel density.

26. A processor-readable medium as recited in claim 23, additionally comprising processor-executable instructions for:

controlling sled speed, wherein the sled speed is calculated to allow at least two deflection inputs to be applied to the laser before a sled position is incremented.

27. A processor-readable medium as recited in claim 23, additionally comprising processor-executable instructions for:
  for a given sled position, applying a first voltage to a tracking coil to deflect the laser a first amount calculated to allow a first row of pixels to be applied to the disk, and applying a second voltage to the tracking coil to deflect the laser a second amount calculated to allow a second row of pixels to be applied to the disk, wherein calibration data, derived from the calibrating, comprises the first and second voltages.

28. A disk labeling system comprising:
  means for sensing, with an optical sensor, a laser striking calibration indicia defined on an optical disk;
  means for determining an input used to deflect the laser to a position where an output of the optical sensor indicates that the laser is striking the calibration indicia; and
  means for calibrating the input to result in laser deflection by a radial distance associated with a height of a pixel to be marked, thereby producing calibration data; and
  means for labeling the disk at specific pixel positions using the calibration data.

29. The disk labeling system of claim 28, additionally comprising:
  means for positioning a sled, carrying the laser and the optical sensor, near the calibration indicia.

30. The disk labeling system of claim 28, additionally comprising:
  means for producing deflection vs. reflection information comprising exemplary voltage levels applied to a deflection coil and resulting deflection.

31. The disk labeling system of claim 28, additionally comprising:
  means for producing deflection vs. reflection information based on non-circular calibration indicia, and for deriving deflection inputs from the deflection vs. reflection information which result in generally circular rows of pixels.

32. The disk labeling system of claim 28, additionally comprising:
  means for determining a voltage to be applied to a tracking coil to result in sufficient deflection by the laser to mark two rings of pixels without moving a sled supporting the laser.

33. The disk labeling system of claim 28, additionally comprising:
  means for marking the optical disk using the laser in a first position; and
  means for deflecting the laser from the first position into a second position, by applying information in the calibration data; and
  means for marking the optical disk using the laser in the second position.

34. A disk labeling system comprising:
  means for sensing a laser striking calibration indicia defined on a rotating disk;
  means for determining an input used to deflect the laser to a position where an amount of deflection is such that the means for sensing senses the laser striking the calibration indicia; and
  means for calibrating, based on the input, a first input used to deflect the laser by a first amount required to mark a first annular ring of pixels and a second input used to deflect the laser by a second required to mark a second annular ring of pixels, wherein the difference between the first and second inputs is associated with a radial height of a pixel;
  means for labeling the disk at specific pixel positions based on the first and second inputs.

35. The disk labeling system of claim 34, additionally comprising:
  means for moving a sled carrying the laser and an optical sensor over a surface of the rotating disk; and
  means for marking first and second annular rings of pixels by deflecting the laser using the first and second inputs.

36. The disk labeling system of claim 34, wherein the means for calibrating additionally comprises:
  means for producing deflection vs. reflection information; and
  means for selecting the first and second input using the deflection vs. reflection information.

37. The disk labeling system of claim 34, additionally comprising:
  means for producing deflection vs. reflection information responsive to non-annular elements in the calibration indicia; and
  means for selecting the first and second input using the deflection vs. reflection information.

38. The disk labeling system of claim 34, wherein the means for calibrating additionally comprises:
  means for determining first and second voltages to be applied to a tracking coil to result in deflection of the laser consistent with marking the first and the second annular rings of pixels.

39. A system, comprising:
  a label design application to obtain label data;
  a calibration module to calculate inputs to a laser controller required to deflect a laser by a radial distance associated with a height of a pixel to mark at least two rings of pixels on a disk without moving a sled supporting the laser; and
  an image-forming application to mark a disk with the label data, wherein the calculated inputs are used to deflect the laser during marking.

40. The system of claim 39, additionally comprising:
  a tracking coil to deflect the laser according to the calculated inputs.

41. The system of claim 39, additionally comprising:
  a tracking coil to deflect the laser by first and second amounts, calculated to mark first and second annular rings of pixels on the disk, in response to first and second inputs to the tracking coil.

42. The system of claim 39, additionally comprising:
  a disk speed controller to control disk spindle speed, and to increase disk spindle speed in response to calibration data resulting in greater pixel density.

43. The system of claim 39, additionally comprising:
  a sled controller to regulate sled movement to allow at least two inputs to be used to deflect the laser before a sled position is incremented.

* * * * *

UNITED STATES PATENT AND TRADEMARK OFFICE
CERTIFICATE OF CORRECTION

| | |
|---|---|
| PATENT NO. | : 7,671,880 B2 |
| APPLICATION NO. | : 10/423541 |
| DATED | : March 2, 2010 |
| INVENTOR(S) | : David Pettigrew et al. |

It is certified that error appears in the above-identified patent and that said Letters Patent is hereby corrected as shown below:

In column 9, line 4, in Claim 11, after "based" insert -- on --.

In column 12, line 4, in Claim 34, after "second" insert -- amount --.

Signed and Sealed this

Twenty-first Day of September, 2010

David J. Kappos
*Director of the United States Patent and Trademark Office*